United States Patent
Zwerg et al.

(10) Patent No.: US 12,072,229 B2
(45) Date of Patent: Aug. 27, 2024

(54) PIEZO-ELECTRIC SENSOR RESET

(71) Applicant: TEXAS INSTRUMENTS INCORPORATED, Dallas, TX (US)

(72) Inventors: Michael Zwerg, Dallas, TX (US); Sudhanshu Khanna, Plano, TX (US); Steven C. Bartling, Dallas, TX (US); Brian Elies, Plano, TX (US); Krishnasawamy Nagaraj, Plano, TX (US); Wei-Yan Shih, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 289 days.

(21) Appl. No.: 17/462,090

(22) Filed: Aug. 31, 2021

(65) Prior Publication Data

US 2021/0389174 A1 Dec. 16, 2021

Related U.S. Application Data

(63) Continuation of application No. 16/191,430, filed on Nov. 14, 2018, now Pat. No. 11,105,676.

(60) Provisional application No. 62/591,663, filed on Nov. 28, 2017.

(51) Int. Cl.
*G01H 11/08* (2006.01)

(52) U.S. Cl.
CPC .................................. *G01H 11/08* (2013.01)

(58) Field of Classification Search
CPC ....................................................... G01H 11/08
See application file for complete search history.

(56) References Cited

U.S. PATENT DOCUMENTS

| | | | |
|---|---|---|---|
| 11,105,676 B2* | 8/2021 | Zwerg | G01H 11/08 |
| 2008/0122453 A1 | 5/2008 | Hunter | |
| 2017/0123548 A1* | 5/2017 | Shih | G01L 1/22 |
| 2017/0272665 A1* | 9/2017 | Kugimiya | A61B 1/00004 |

* cited by examiner

*Primary Examiner* — David Z Huang
(74) *Attorney, Agent, or Firm* — Mandy Barsilai Fernandez; Frank D. Cimino (57) ABSTRACT

In described examples, each node between adjacent capacitive elements of a stack of series-coupled capacitive elements is biased during a reset mode, where each of the capacitive elements includes piezoelectric material. A strain-induced voltage is generated across each of the capacitive elements. Each of the strain-induced voltages is combined to generate a piezoelectric-responsive output signal during a sensing mode at a time different from the time of the reset mode.

21 Claims, 6 Drawing Sheets

PIEZO-ELECTRIC SENSOR RESET

CROSS-REFERENCE TO RELATED APPLICATIONS

This application is a continuation of U.S. patent application Ser. No. 16/191,430, filed Nov. 14, 2018, which claims the benefit of U.S. Provisional Patent Application No. 62/591,663, filed Nov. 28, 2017, each of which is incorporated by reference herein in its entirety.

BACKGROUND

Vibration sensors can include piezoelectric-based materials. Such materials can include piezoelectric ceramics, such as lead zirconate titanate (PZT). Piezoelectric devices can include a piezoelectric sensor coupled to an analog front end (AFE) for signal conditioning, such that the piezoelectric devices can monitor or otherwise respond to relatively small signals generated by the piezoelectric sensor. However, the electrical signals generated by the piezoelectric sensor can be generated in response to a variety of environmental stimuli, such as vibration or other forces or environmental effects affecting electrical characteristics of the piezoelectric sensors. The response of the piezoelectric sensor to the varying stimuli can obscure smaller signals generated by the piezoelectric sensor in response to a particular environmental stimulus.

SUMMARY

In described examples, each node between adjacent capacitive elements of a stack of series-coupled capacitive elements is biased during a reset mode, where each of the capacitive elements includes piezoelectric material. A strain-induced voltage is generated across each of the capacitive elements. Each of the strain-induced voltages is combined to generate a piezoelectric-responsive output signal during a sensing mode at a time different from the time of the reset mode.

DETAILED DESCRIPTION

Piezoelectric sensors (e.g., piezo sensors) are sensitive to strain effects (e.g., piezo-electric effects) as well as to temperature changes (e.g., pyro-electric effects). As described herein, the portion of a sensor signal due to changes in strain is relatively fast changing and includes relatively small strain-related signal levels. (The term "portion" can mean an entire portion or a portion that is less than the entire portion.) In contrast, the portion of a sensor signal due to changes in temperature is relatively slow changing and includes relatively large temperature-related signal levels. For example, the piezo sensor signal changes due to changes in operating temperature can be orders of magnitude greater than the piezo sensor signal changes due to changes in strain (e.g., due to vibration).

To detect motion, example piezoelectric devices described hereinbelow can measure the portion of piezo sensor signals due to strain changes by suppressing the effects of the piezo sensor signal caused by temperature changes. "Stacking" (e.g., arranging and/or being coupled in series) several piezo sensor elements in a serial chain can boost portions of the sensor signal that are produced in response to changes in strain on the piezoelectric devices. To help suppress the temperature response (e.g., which otherwise can obscure the relatively smaller strain-induced electrical responses), each sensor element can be reset to a nominal voltage at periodic intervals. Periodically resetting (e.g., periodically biasing to a common voltage) each of the sensor elements shortens the time window over which pyroelectric responses can occur. The periodic reset function can effectively function in a similar manner (e.g., function as) a high pass filter, which can effectively remove the relatively slow-changing portions of the piezo sensor signal that result from temperature drifting over longer periods of time.

Some example piezo devices described hereinbelow can include piezo sensor embedded in a silicon substrate. Embedding the piezo sensor on silicon can allow the stacking of the sensor elements to boost the signal response, and yet maintain individual control of each of the sensor elements, such that portions of the piezo sensor signal that result from changes in temperature can be suppressed. As described herein, an automatic reset (e.g., periodic reset) of each sensor element of an embedded piezoelectric sensor facilitates the detection of a change in motion (e.g., over longer periods of time) by reducing the portions of the piezo sensor signal that result from changes in temperature.

In various apparatus and methods of example piezo devices described hereinbelow, a system of an example piezo device can: 1) select a "wake" or a "sleep" operating mode for a microcontroller unit (MCU) in response to a respective detected change in motion or a determination of lack of a change in motion; 2) select a "wake" or a "sleep" operating mode for a microcontroller unit (MCU) in response to a strain sensor sensing a respective detected change in motion or sensing a lack of a change in motion; 3) select a "wake" or a "sleep" operating mode for a microcontroller unit (MCU) in response to a piezo-electric based strain sensor for sensing a respective detected change in motion or for determining a lack of change in motion piezo-electric based strain sensor; and/or 4) select a "wake" or a "sleep" operating mode for a microcontroller unit (MCU) in response to an integrated (e.g., integrated on a common substrate) PZT piezo-electric based strain sensor for sensing a respective detected change in motion or for determining a lack of a change in motion.

Figure 1:
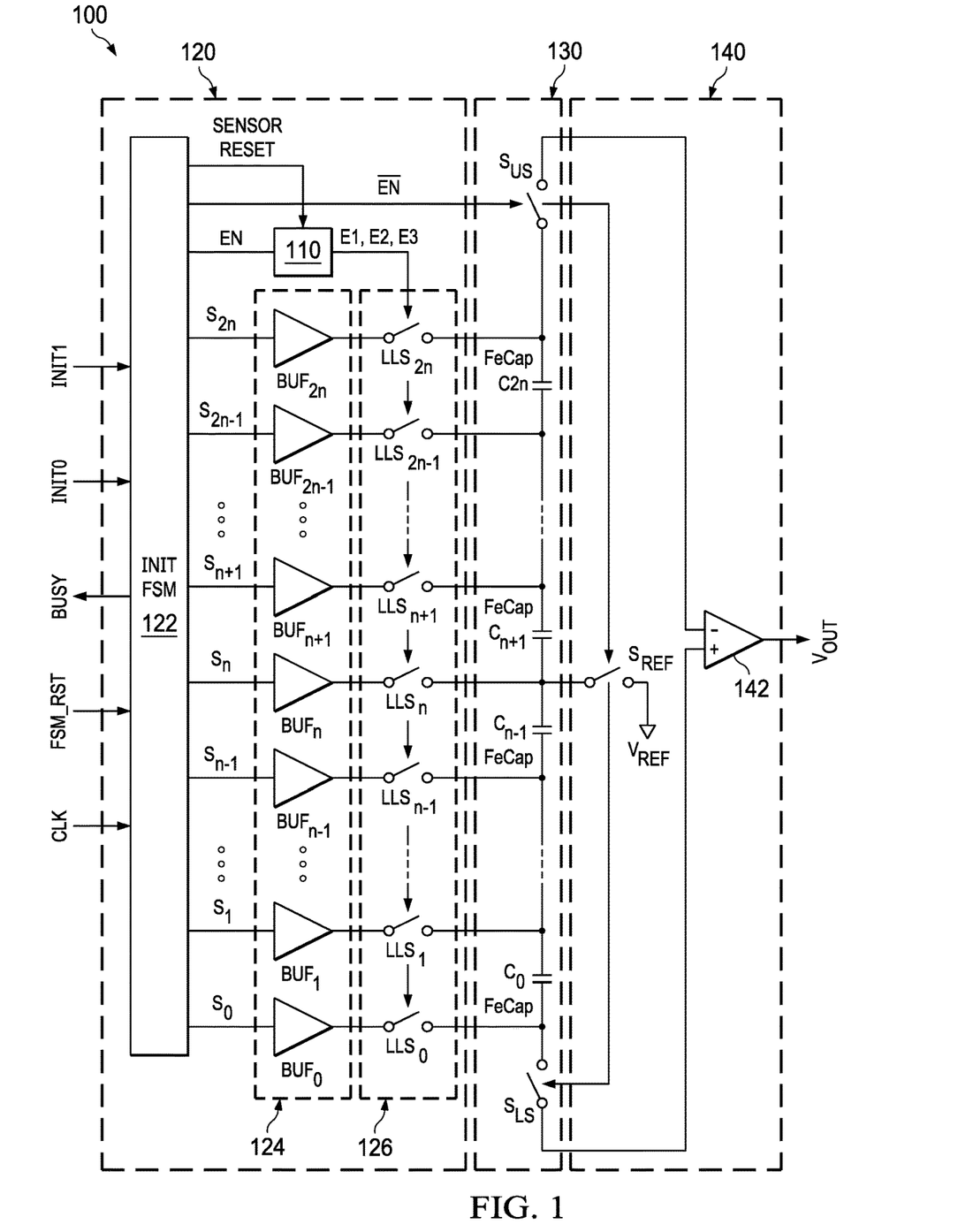
FIG. 1 is a block diagram of an example piezoelectric sensor in a differential configuration.

FIG. 1 is a block diagram of an example piezoelectric sensor 100 in a differential configuration. For example, the sensor 100 can be generally described as including three stages: a first stage, such as a pre-conditioning circuit 120; a second stage, such as a stack of piezoelectric sensor elements (e.g., piezoelectric capacitive elements), shown collectively as piezoelectric capacitor stack 130; and a third stage, such as a sensor output circuit 140. Each of the stages as described herein can be implemented as a single integrated circuit in which the stages and other elements are mutually integrated into a monolithic structure, such as a single integrated circuit substrate. A piezoelectric sensing element can be referred to as a "capacitive element" (or sometimes "capacitor") because of its capacitive behavior when coupled to an electrical circuit.

The example pre-conditioning circuit 120 includes an initialization finite state machine (INIT FSM) 122. The INIT FSM 122 can include logic gates, memory, and/or a controller or other processor. The INIT FSM 122 achieves FSM state transitions (e.g., as sequentially ordered operations) for selectively asserting a number 2n+1 "poling" (e.g., for polarizing) signals $S_0$ through $S_{2n}$ for polarizing (e.g., repolarizing) capacitor elements (e.g., elements $C_0$ through $C_{2n}$) of the stack 130. Each of the poling signals $S_0$ through $S_{2n}$ (e.g., when asserted) is operable to polarize (e.g., including a partially polarize) a respective capacitor element in stack 130. Accordingly, the INIT FSM 122 is operable to configure the sensor 100 in various operational modes (and is not limited only to "initialization" functions).

In an example, the INIT FSM 122 receives four input signals: 1) a clock signal CLK; 2) a reset signal FSM_RST; 3) a negative polarization signal INIT0; and 4) a positive polarization initialization signal INIT1. The INIT FSM 122 also includes a number of output signals, such as the poling signals $S_0$ through $S_{2n}$. Each of the poling signals $S_0$ through $S_{2n}$ is coupled as an input to a respective buffer of buffer bank 124, and each paralleled output of the buffer bank 124 is coupled as an input to a respective switch (e.g., low leakage switch) in switch bank 126. Each respective switch of switch bank 126 can be instantiated as at least one transistor as described hereinbelow with reference to FIG. 2.

The INIT FSM 122 also generates output control signals, such as an enable signal and a busy signal, for controlling the stack 130. The enable signal EN (and its complement, $\overline{EN}$) is generated for controlling (e.g., individually or collectively) each of the low leakage switches in the switch bank 126, as described hereinbelow. The reset circuit 110 is responsive to the enable signal EN to assert enable signals E1, E2, and E3 (of FIG. 2) in various modes, such as: a polarization mode (e.g., described hereinbelow with respect to FIG. 3); a sensing (e.g., active) mode (e.g., described hereinbelow with respect to FIG. 4); and a sensor reset mode (e.g., described hereinbelow with respect to FIG. 5). The BUSY output signal is asserted to indicate that the INIT FSM 122 is in an active state (e.g., is not in an idle state).

The stack 130 includes a chain of number 2n of serially-coupled capacitors, $C_0$ through $C_{2n}$. For example, an upper electrode of capacitor $C_0$ is coupled to a lower electrode of capacitor $C_1$ (not explicitly shown), an upper electrode of capacitor $C_1$ is coupled to a lower electrode of capacitor $C_2$ (not explicitly shown), and so forth on through to where an upper electrode of capacitor $C_{n-2}$ (not explicitly shown) is coupled to a lower electrode of capacitor $C_{n-1}$. The upper electrode of capacitor $C_{n-1}$ is coupled to a lower electrode of capacitor $C_{n+1}$, and so forth on through to where an upper electrode of capacitor $C_{2n-1}$ (not explicitly shown) is coupled to a lower electrode of capacitor $C_{2n}$.

In various examples, the value of n can be selected in accordance with the examples described herein, and can be selected from a range, such as $5 \leq n \leq 32$. Also, the number of capacitors in the stack 130 can be one less than the total number of buffers in the buffer bank 124 (and can be one less than the total number of the low leakage switches LLS in the switch bank 126).

In various examples, each capacitor in stack 130 is a ferroelectric capacitor (FeCap).

Also, in various examples, the capacitors of the stack 130 are formed on a single semiconductor device, in which the lower electrode of each capacitor is in a same first fabrication layer, each capacitor ferroelectric layer is in a same second fabrication layer, and the upper electrode of each capacitor is in a same third fabrication layer, wherein each upper electrode is coupled (e.g., electrically coupled through a "via" that extends vertically between fabrication layers) to a next capacitor lower electrode (e.g., and so on until the upper electrode of the end capacitor is encountered). Accordingly, environmental factors, such as processing, temperature, and physical stresses, are more uniformly applied across the capacitors of the stack 130, which can provide greater accuracy in the piezoelectric response achieved by stack 130 when applying the techniques and circuits described herein.

The end terminals (e.g., outputs or output nodes) of terminal capacitive elements of the stack 130 are switchably coupled to respective inputs (e.g., input terminals) of the differential amplifier 142. For example, the lower electrode of capacitor $C_0$ is switchably coupled (as well as the output of low leakage switch $LLS_0$ described hereinabove) through a first (e.g., lower) stack switch $S_{LS}$ to a noninverting terminal of the amplifier 142, whereas the upper electrode of capacitor $C_{2n}$ is coupled (as well as the output of low leakage switch $LLS_n$ described hereinabove) through a second (e.g., upper) stack switch $S_{US}$ to the inverting terminal of the amplifier 142. For example, the first stack includes at least three capacitive elements coupled in series, and the second stack includes at least three capacitive elements coupled in series. Additionally, the center tap of the stack 130 is switchably coupled to the reference voltage (e.g., nominal voltage) VREF via a third (e.g., center) stack switch $S_{REF}$ (reference switch), described hereinbelow. Each of the stack switches $S_{LS}$, $S_{US}$ and $S_{REF}$ is controlled by $\overline{EN}$: that is, when $\overline{EN}$ is asserted, each such switch closes (such as during a sensing mode); and when $\overline{EN}$ is de-asserted, each such switch opens (such as during a polarization mode). (Additionally, a sensor reset mode is described hereinbelow with at least respect to FIG. 5.)

The sensor output circuit 140 includes the amplifier 142 (which can optionally include multiple amplification stages for greater gains). The amplifier is signal amplification circuitry for differentially generating an output signal in response to first and second input terminals. The amplifier 142 is powered by two rail voltages (which are not shown, but are inherent to active circuitry), which can be referred to as $V_{DD}$ (e.g., where $V_{DD}$ is the high-side voltage) and $V_{SS}$ (e.g., where $V_{SS}$ can be the low-side voltage, or simply, ground). The voltage reference VREF is a voltage that is between (e.g., halfway between) the rail voltages of amplifier 142. The output node of the amplifier 142 $V_{OUT}$ is the piezoelectric sensor signal.

As described herein, the sensor 100 includes three modes: a polarization mode, a sensing mode and a sensor reset mode. In various examples, each of the three modes is performed within a time (e.g., time period) that is different from the time within another of the other two modes is performed.

In a first mode (e.g., the polarization mode), the pre-conditioning circuit 120 co-aligns the ferroelectric polarization of capacitors $C_0$ through $C_{2n}$ in a same direction (e.g., direction of polarity) by applying the same voltage across each individual capacitor element. The resulting aligned polarity enhances the constructive addition of sensitivity of each capacitor, for example, which improves a signal-to-noise (SNR) response. Operation in the first mode (e.g., the polarization mode) can be executed as a part of the manufacturing process of sensor 100: for example, the polarization mode can be initiated by the manufacturer and before the release of the device to a user/consumer and before deployment to the field.

Additionally, the operation in the polarization mode can be initiated after deployment, such that a subsequent reconditioning of the polarization in the stack 130 can be achieved in the field. Accordingly, the sensor 100 can be freshly repolarized to align the polarization of the capacitor elements of stack 130 in a same direction, which offsets depolarization that can occur due to influences of time, normal or abnormal operation, and environmental effects. Operation in the polarization mode can be repeated (e.g., in response to an analysis of the piezo sensor signal by a processor), such that the SNR of the piezo sensor signal can be periodically improved (e.g., by repeatedly offsetting the degradation of the polarization of the capacitor elements of stack 130 that can occur over time). Operation of the sensor 100 in the polarization mode is described hereinbelow with respect to FIG. 2 and FIG. 3.

In a second mode (e.g., the piezoelectric sensing mode), the sensor 100 is arranged to respond to (e.g., sense) environmental stimuli by measuring the effect of such stimuli upon the piezoelectric material of stack 130. For example, the environmental stimuli produce various responses in the piezo sensor signal $V_{OUT}$. The piezo sensor signal $V_{OUT}$ includes indications of changes in at least one condition of the environmental stimuli imposed on the piezoelectric material.

Piezoelectric sensors operating in the piezoelectric sensing mode can be used in various applications. Examples of such applications include detecting the change of strain, pressure, stress, acceleration, temperature (using the pyroelectric behavior of the sensing material), or force, where the such changes are imposed on the stack 130 and converted by amplifier 142 into the piezo sensor signal $V_{OUT}$.

As described herein, operating in the piezoelectric sensing mode to generate the piezo sensor signal $V_{OUT}$ can be initiated after completing operation in the polarization mode. Operating in the piezoelectric sensing mode can be initiated after completing a pre-conditioning by the manufacturer of sensor 100, or, after completing one of the repeated reconditioning operations to repolarize the capacitor elements of the stack 130. Operation of the sensor 100 in the piezoelectric sensing mode is described herein below with respect to FIG. 2 and FIG. 4.

In a third mode (e.g., the sensor reset mode), the sensor 100 is reset to a nominal voltage (e.g., VREF) at periodic intervals. The sensor 100 can be reset in the reset mode to a nominal voltage by the pre-conditioning circuit 120 being arranged to periodically bias each of the nodes between adjacent capacitive elements of a first and second stack of the capacitive elements. For example, the sensor 100 can be automatically reset at periodic intervals (e.g., defined intervals as determined by a timer function of the INIT FSM 122). In one example, the sensor 100 is automatically reset at periodic intervals to reduce temperature-induced effects on the output of the piezo sensor signal $V_{OUT}$. In another example, a high-pass filter (not shown) can be coupled to the output(s) of each sensor element of the stack 130. In another example, a processor can be arranged to analyze the sensor 100 response (e.g., piezo sensor signal $V_{OUT}$) and separate the signal components of the piezo sensor signal $V_{OUT}$ by digitizing and performing post-processing signal analysis on the piezo sensor signal $V_{OUT}$. In other examples, various combinations of the periodic resetting of the capacitor elements of the stack 130, the high-pass filtering, and the post-processing analysis can be used to increase the discrimination of the strain-induced portions of the piezo sensor signal $V_{OUT}$.

Figure 2:
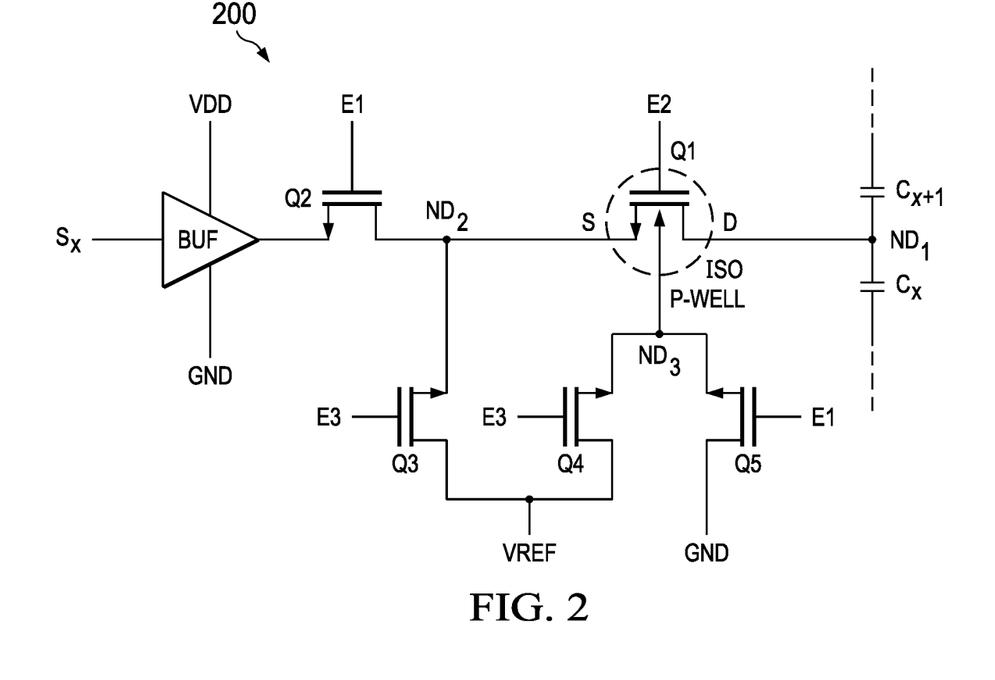
FIG. 2 is a schematic diagram of an example switch circuit for each low leakage switch of FIG. 1.

FIG. 2 is a schematic diagram of an example switch circuit 200 for each low leakage switch $LLS_0$ through $LLS_{2n}$ of FIG. 1. Each such switch circuit 200 is formed so as to minimize leakage from the respective capacitor stack node through the switch circuit 200 while operating in a sensing mode. In the sensing mode, any relatively small change in charge across the stack 130 generated by capacitors $C_x$ and/or $C_{x+1}$ (e.g., within the stack 130) is conserved (e.g., which can improve the SNR of the sensed output voltage $V_{OUT}$). Accordingly, the generated voltages are isolated from being coupled by any leakage path to the poling circuitry or voltage references, such that the capacitors $C_x$ and/or $C_{x+1}$ are isolated during the sensing mode.

Switch circuit 200 includes a node $ND_1$ coupled between capacitors $C_x$ and $C_{x+1}$ (e.g., of any two adjacent capacitors of stack 130) and a drain (e.g., output) of a transistor Q1, which is an isolated (e.g., P-well isolated) NMOS transistor. The gate of transistor Q1 is coupled to the E2 signal, the source (e.g., input) of transistor Q1 is coupled to a node $ND_2$, and the backgate of transistor Q1 is coupled to a node $ND_3$. The node $ND_2$ is further coupled to the drain of a transistor Q2, the gate of transistor Q2 is coupled to the E1 signal, and the source of transistor Q2 is coupled to an output of a respective buffer BUF, described hereinabove with respect to FIG. 1. Node $ND_2$ is further coupled to a source of a transistor Q3, which includes a gate coupled to E3 and a drain coupled to VREF. Node $ND_3$ is further coupled to a source of a transistor Q4, which includes a gate coupled to E3 and a drain coupled to VREF. The node $ND_3$ is also coupled to a source of a transistor Q5, which includes a gate coupled to E1 and a drain coupled to ground. The node ND3 is connected to the isolated p-well of Q1 and is arranged to control the back biasing voltage.

The operation of the switch circuit 200 is described hereinbelow with respect to FIG. 3, FIG. 4, and FIG. 5. The polarization mode is described hereinbelow with respect to FIG. 3. The sensor active mode is described hereinbelow with respect to FIG. 4. The sensor reset mode is described hereinbelow with respect to FIG. 5.

Figure 3:
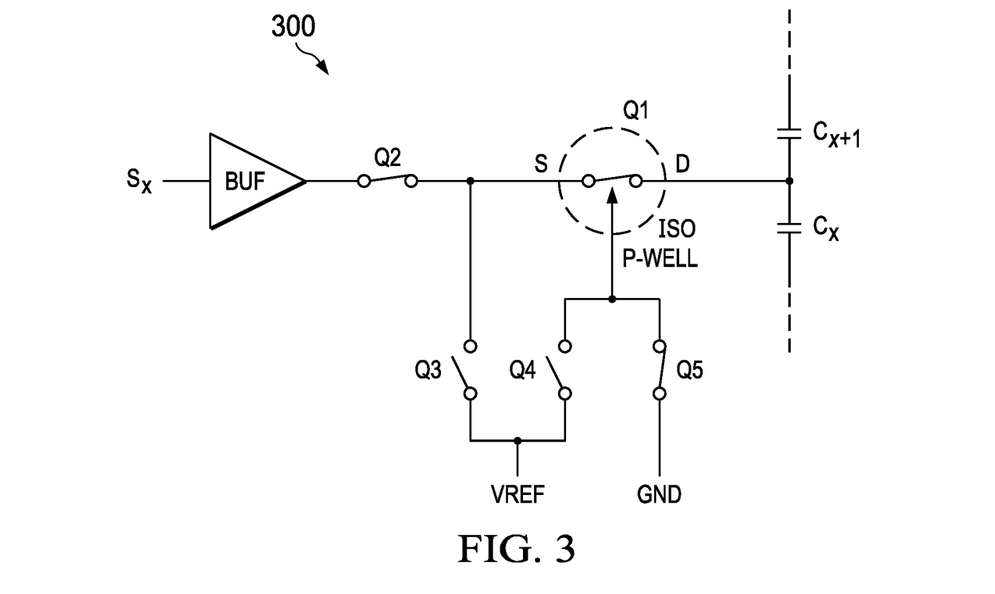
FIG. 3 is a schematic diagram of an example switch circuit arranged in a polarization mode.

FIG. 3 is a schematic diagram of an example switch circuit 300 arranged in a polarization mode. In the polarization mode the switch circuit 300 is arranged to selectively couple a polarization voltage to each of the nodes between adjacent capacitive elements of the first (or second) stack of the adjacent capacitive elements in a polarization mode. In the polarization mode, the signals E1 and E2 (as shown in FIG. 2) are asserted, which selectively closes transistors Q1, Q2, and Q5 of the switch circuit 300; whereas the signal E3 is not asserted, such that the transistors Q3 and Q4 of the switch circuit 300 are open and not enabled. Accordingly, the buffer BUF is coupled to drive a poling signal $S_x$ along the source/drain (e.g., input/output) paths of transistors Q2 and Q1 to the respective node in stack 130. Also during the polarization mode, the source of transistor Q5 couples the p-well of transistor Q1 to a ground potential, which enhances the transconductance of transistor Q1.

Figure 4:
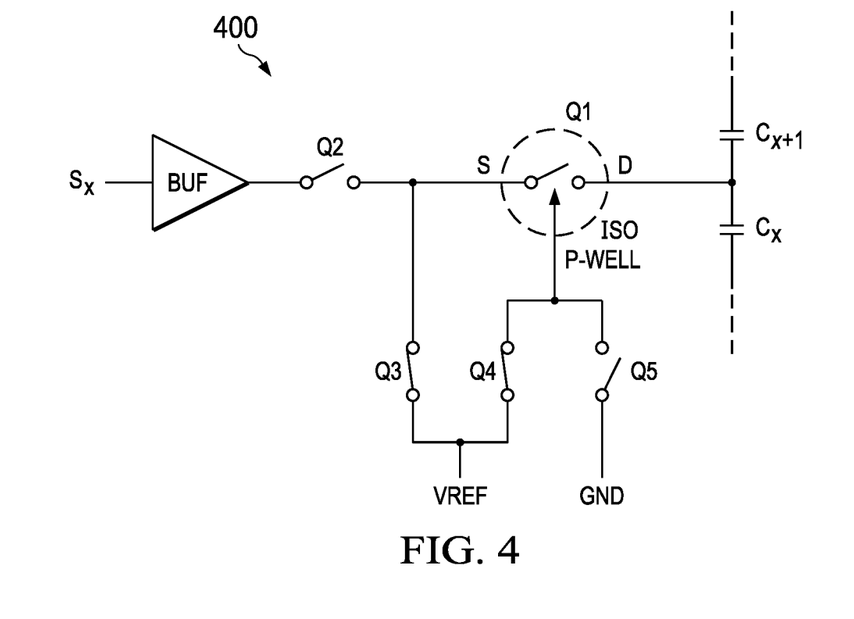
FIG. 4 is a schematic diagram of an example switch circuit arranged in a sensing mode.

FIG. 4 is a schematic diagram of an example switch circuit 400 arranged in a sensing mode. In the sensing mode, the signal E3 (as shown in FIG. 2) is asserted, which selectively closes transistors Q3 and Q4 of the switch circuit 300; whereas the signals E1 and E2 are not asserted, such that the transistors Q1, Q2, and Q5 of the switch circuit 400 are open and not enabled. Accordingly, the source of the transistor Q1 is decoupled from poling signal $S_x$ generated by the respective buffer BUF. Instead, the transistor Q3 couples the source of the transistor Q1 to VREF, and the transistor Q4 couples the backgate of the transistor Q1 to VREF. Driving the source and backgate of the transistor Q1 to the same potential (e.g., VREF) helps eliminate potential leakage paths from the capacitor sensor of stack 130 through transistor Q1 because the multiple nodes being driven to the same potential VREF does not induce current flow (e.g., leakage). Accordingly, the switch 400 is a low-leakage switch that is configured to isolate the serial-coupled capacitors of the stack 130 from any poling signal or circuitry associated therewith. Isolating the serial-coupled capacitors of the stack 130 helps isolate the charge on each of the stack 130 capacitors against leakage, which in turn conserves charge for generating a more robust piezo sensor signal VOUT.

Figure 5:
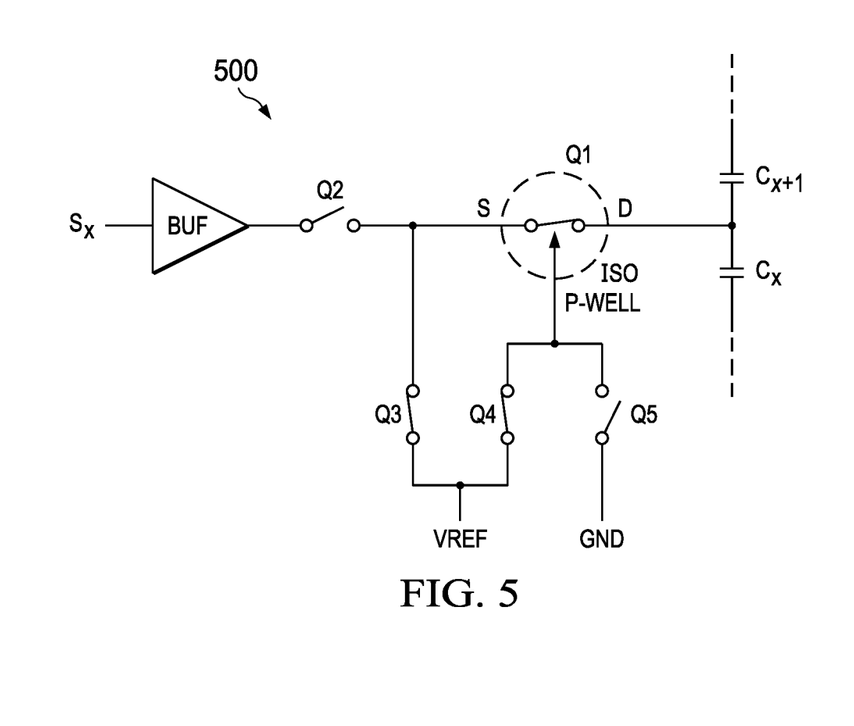
FIG. 5 is a schematic diagram of an example switch circuit arranged in a sensor reset mode.

FIG. 5 is a schematic diagram of an example switch circuit 500 arranged in a sensor reset mode. In the sensor reset mode, the signals E2 and E3 (as shown in FIG. 2) are asserted, which selectively closes transistors Q1, Q3, and Q4 of the switch circuit 500; whereas the signal E1 is not asserted, such that the transistors Q2 and Q5 of the switch circuit 500 are open and not enabled. Accordingly, the source of the transistor Q1 is decoupled from poling signal $S_x$ generated by the respective buffer BUF. Instead, the transistor Q3 couples the source of the transistor Q1 to VREF, and the transistor Q4 couples the backgate of the transistor Q1 to VREF (e.g., Q4 is arranged to bias the backgate of Q1). In the sensor reset mode, the transistor Q1 is arranged to conduct, which couples the potential VREF at the source of the transistor Q1 to a respective node (e.g., node $ND_1$) between adjacent capacitors (e.g., two different capacitors electrically coupled via a common node) capacitors of the stack 130. Transistor Q1 is arranged to couple the potential VREF at the source of the transistor Q1 to each of the nodes (e.g., node $ND_1$) between adjacent capacitors of the stack 130 equalizes the charge of each of the stack 130 capacitors. Coupling the potential VREF at the source of the transistor Q1 to each of the nodes resets the piezo sensor signal $V_{OUT}$ (e.g., resets with respect to voltages generated in response to pyroelectric effects). As described herein, periodically resetting the charges of each of the stack 130 capacitors helps reduce the effects (e.g., larger effects) of temperature drift upon the piezo sensor signal $V_{OUT}$.

Figure 6:
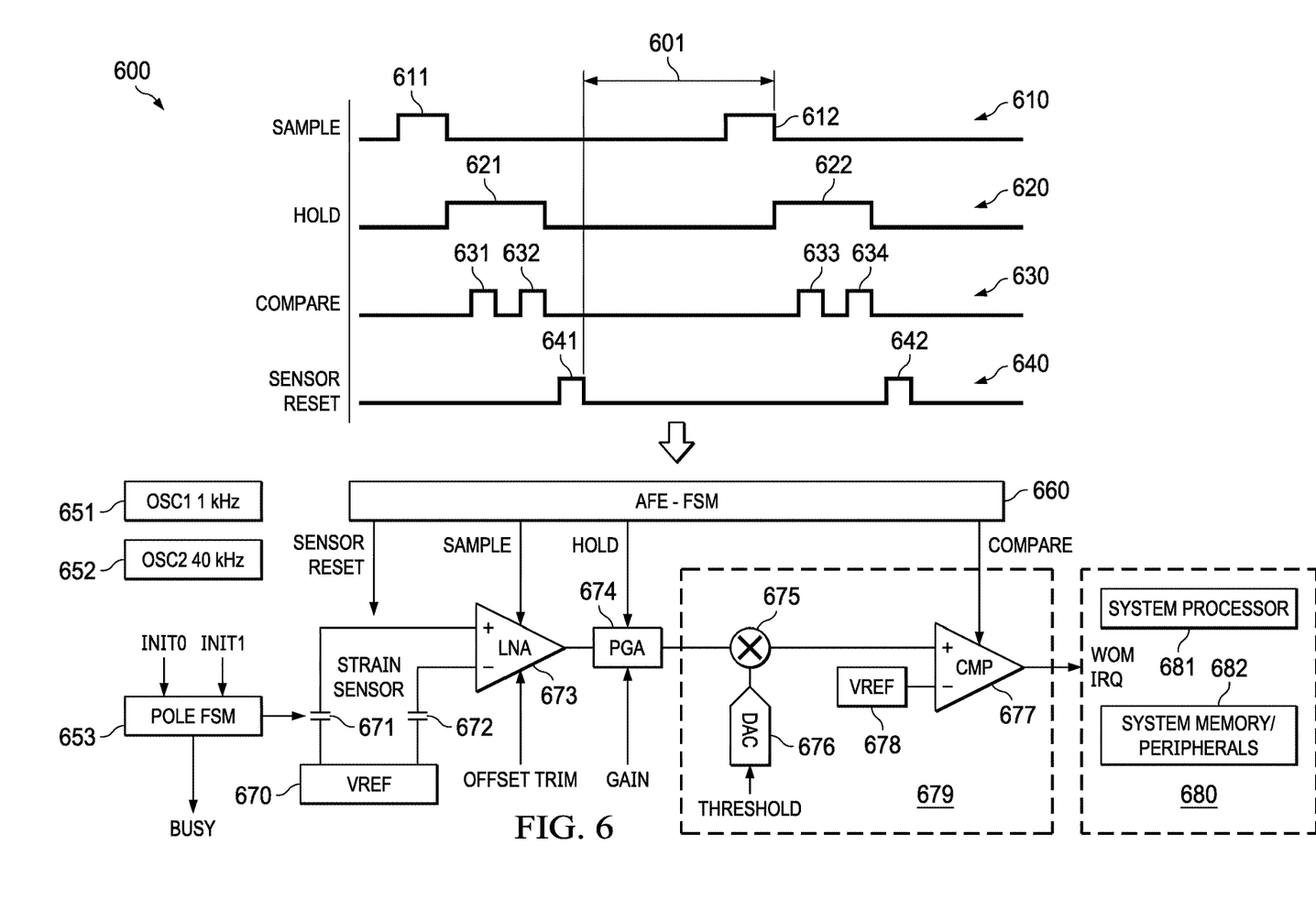
FIG. 6 is a schematic diagram of an example wake-on-motion piezoelectric sensing system.

FIG. 6 is a schematic diagram of an example wake-on-motion piezoelectric sensing system 600. The system 600 includes the first oscillator 651, and a second oscillator 652. For example, the first oscillator 651 generates a first clock signal (not shown) having relatively long period (e.g., 1 ms), whereas the second oscillator 652 generates the second clock symbol (not shown) having a relatively short period (e.g., 0.025 ms). The first and second clock signals can be used to clock the pole (e.g., polarization) FSM 653 and the analog front end (AFE) FSM 660. The first clock signal can be used to initiate the start of a sensor sample sequence (e.g., at a sampling frequency), whereas the second clock signal can be used to initiate (and/or coordinate) various events that follow the start of a particular operational mode (e.g., a sample-and-hold mode, a compare mode, or a sensor reset mode).

To begin operation of the system 600, the pole FSM can be activated by control signals (e.g., INIT0 or INIT1) to (re-)polarize the first capacitor stack 671 and a second capacitor stack 672 (which are coupled respectively to the non-inverting and the inverting inputs of the low noise amplifier 673). The repolarized first and second capacitor stacks can be reset (as described herein above) in response to a sensor reset 640 signal, which normalizes the bias voltage (e.g., to VREF 670) on each node between individual capacitors of the first and second capacitor stacks 671 and 672. Normalizing the bias voltages initializes the first and second capacitor stacks 671 and 672 for operation in a sensing mode.

While components 680 are operating in a sleep mode, the first and second capacitor stacks 671 and 672 can be electrically isolated to accumulate changes in charge due to environmental effects. The accumulated changes in charge can be sensed to determine whether a strain stress induced due to movement of the system 600 has occurred, and if so, perform a wake-on-motion operation. The periodic sensing can be initiated in response to the first clock signal (e.g., output by OSC1 651).

The changes in charge of the first and second capacitor stacks 671 and 672 can be sampled by coupling the outputs of the first and second capacitor stacks 671 and 672 to opposing inputs of the low noise amplifier (LNA) 673. The net (e.g., combined) charge of the first and second capacitor stacks 671 and 672 can be measured by closing the stack switches $S_{LS}$, $S_{US}$ and $S_{REF}$ described hereinabove with respect to FIG. 1 during the sample period 611 (e.g., determined by Sample signal 610) and the hold period 621 (e.g., determined by Hold signal 620). The LNA 673 can be trimmed during calibration such that the offset of the LNA 673 is centered around the VREF potential. In an example system 600, the LNA 673 includes a gain of around 400 percent.

The output of the LNA 673 (e.g., which can be the same as the piezoelectric sensor signal $V_{OUT}$) is coupled to the input of the programmable gain amplifier (PGA) 674. The output of the PGA 674 is coupled to measurement circuitry 679, which can include the comparator (CMP) 677, the digital-to-analog converter (DAC) 676; and the gain of the mixer 675. In other examples, the measurement circuitry 679 can include an analog-to-digital converter (ADC, not shown) coupled to a processor arranged to log (e.g., store in memory) and/or compare digital samples of the output of the PGA 674.

The gain of the PGA 674 can be determined in response to: the rail voltages of the CMP 677; one or two thresholds (e.g., upper and lower thresholds) generated by the DAC 676; and the gain of the mixer 675.

During time period 631 (e.g., determined by Compare signal 630), the differential output of the first and second capacitors stack 671 and 672 are effectively compared against a first threshold. For example, the DAC 676 can be programmed with a first threshold (e.g., lower threshold) to determine (e.g., by operation of CMP 677) whether the differential output of the first and second capacitors stack 671 and 672 has fallen below VREF by at least the first threshold. In a similar manner, the DAC 676 can be programmed with a second threshold (e.g., upper threshold) during a time period 632 to determine whether the differential output of the first and second capacitors stack 671 and 672 has risen above VREF by at least the second threshold. In one example, the first and second thresholds are voltages spaced equally around the voltage VREF coupled to the inverting input of the CMP 677.

If the CMP 677 indicates a comparison result of either (1) the differential output of the first and second capacitors stack 671 and 672 has fallen below VREF by at least the first threshold or (2) the differential output of the first and second capacitors stack 671 and 672 has risen above VREF by at least the second threshold, the CMP 677 asserts an activation signal (e.g., the wake-on-movement interrupt request, WOM IRQ), which is coupled to activate components 680 previously in a sleep mode state. The AFE FSM 660 can control the sequencing of the first and second thresholds for the comparisons.

The components 680 can be in a housing separate from a housing including the strain sensors (e.g., the individual capacitors of the first and second capacitor stacks 671 and 672). (The term "housing" can mean a package or a sealed subassembly/assembly, which can include control circuitry and sensors in a local environment that is sealed from an outside environment.) The components 680 to-be-activated can include components such as system processor 681 and system memory/peripherals 682 that are in a state of reduced operational power consumption during a sleep mode.

After sensing (e.g., in a sensing mode) the first and second capacitor stacks are reset during time period 641 (e.g., for operating in a reset sensor mode) indicated by the sensor reset 640 signal. The reset normalizes the bias voltage on each node between individual capacitors of the first and second capacitor stacks 671 and 672 (e.g., such that the charge on each capacitor is equalized). As described herein, the resetting of the capacitor stacks (e.g., 671 and 672) after operating in the sensing mode, limits (or otherwise shortens) a time period during which accumulated thermal "creep" or drift could otherwise induce a sufficiently strong combined output of the first and second capacitors stack 671 and 672, such that a false WOM IRQ (wake-on-motion interrupt request) is asserted. For example, the time period during which accumulated thermal "creep" (e.g., changes in temperature) could otherwise occur is limited to time period 601 (which is, in the example, less than 1 ms). The length of the time period 601 can be adjusted to control the high pass frequency cutoff point of the piezoelectric sensor signal: for example, shortening the length of the time period 601 increases the high (e.g., higher) frequency content of the piezoelectric sensor signal (which reduces the amount of the lower frequency temperature-induced information in the piezoelectric sensor signal).

After a period of relative inactivity (e.g., during the first portion of time period, in which power can be conserved by circuitry operating in a sleep mode), another polarization/sensing/reset cycle can be performed (the polarization mode is optional, and can be initiated over longer periods than illustrated). For example, the first and second capacitor stacks 671 and 672 are coupled to opposing inputs of the LNA 673 by closing the stack switches $S_{LS}$, $S_{US}$ and $S_{REF}$ during the sample period 612 (e.g., determined by Sample signal 610) and the hold period 622. During time period 633, the combined output of the first and second capacitors stack 671 and 672 are effectively compared against the first threshold. During time period 634, the combined output of the first and second capacitors stack 671 and 672 are effectively compared against the second threshold. Accordingly the combined output signal of the first and second capacitors stack 671 and 672 is "thresholded" by comparing the combined output signal of the first and second capacitors stack 671 and 672 against at least one threshold (e.g., where a system event—such as a wake event—can be generated in response to a comparison of the combined output signal against a threshold).

After the sensing period (e.g., during time periods 633, and 634), the first and second capacitor stacks 671 and 672 can be reset (as described hereinabove) during time period 642. Resetting the first and second capacitor stacks 671 and 672 renormalizes the bias voltage of each node between adjacent capacitors of the first and second capacitor stacks 671 and 672 (which in turn truncates the time period available for changes in temperature to affect the sensing voltages generated by the first and second capacitor stacks 671 and 672). Accordingly, temperature change-induced voltages of the first and second capacitor stacks 671 and 672 can be reduced in response to periodically biasing each node between adjacent capacitive elements of the first and second capacitor stacks 671 and 672 during successive reset node periods.

In a similar manner, the sensing voltages of the first and second capacitor stacks 671 and 672 can be periodically sampled (e.g., when the system processor 681 and system memory/peripherals 682 are in a wake mode) to determine a lack of motion. In response to the determined lack of motion, the measurement circuitry 679 can assert a deactivation signal, such that the system processor 681 and system memory/peripherals 682 can be placed in a sleep mode (e.g., to conserve power when not actively being used by a user).

Figure 7:
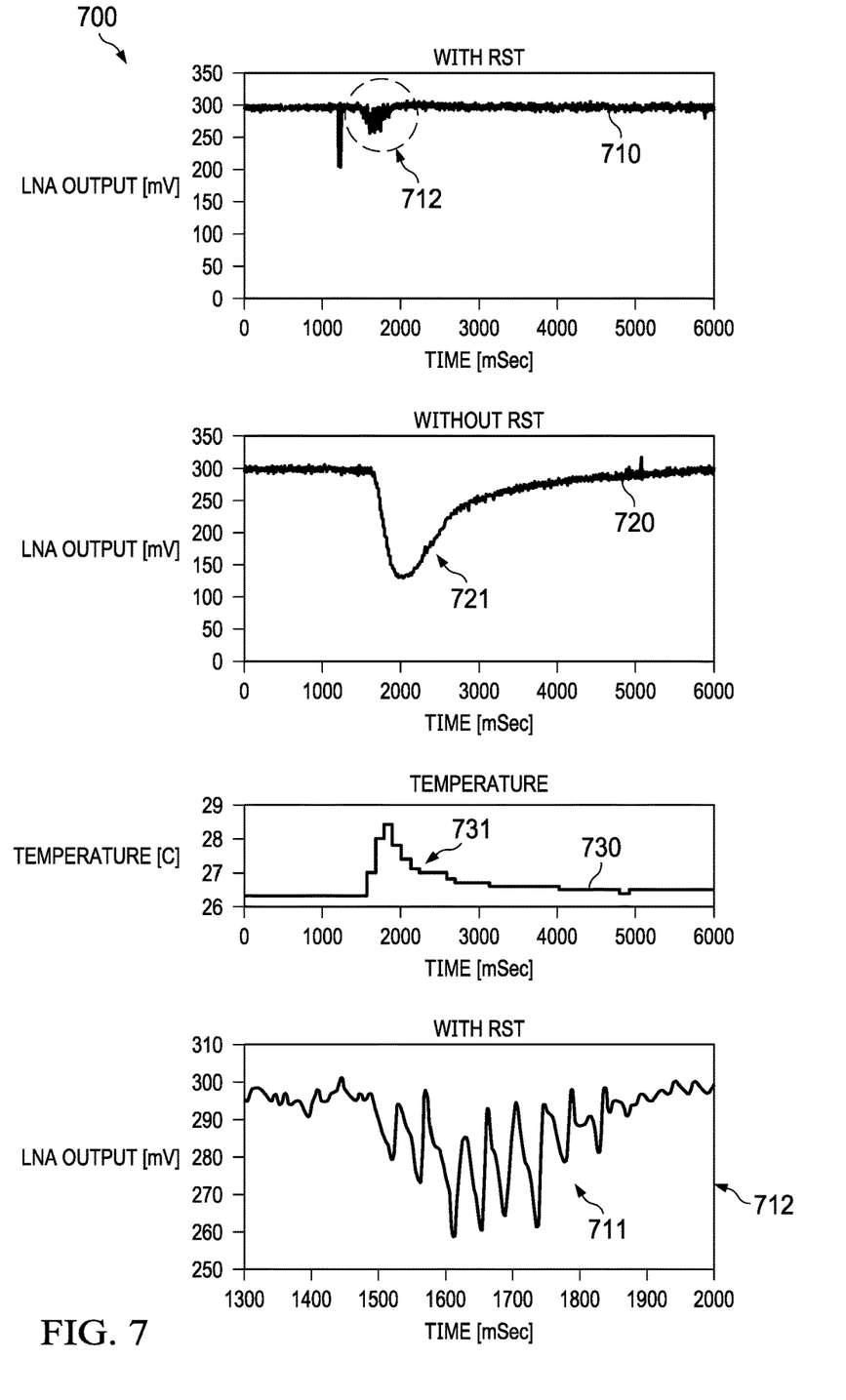
FIG. 7 is a waveform diagram of responses to temperature change in a first test scenario of an example piezoelectric sensing system.

FIG. 7 is a waveform diagram of responses to temperature change in a first test scenario 700 of an example piezoelectric sensing system. The test scenario 700 includes an example piezoelectric sensor signal waveform 710 generated in response to real-world measurements of an example piezoelectric sensor (such as example sensor 100) periodically operating in a reset sensor mode, such as described hereinabove with respect to FIG. 6.

For example, the waveform 710 can be generated as the output of the LNA 673, where the waveform 710 includes a voltage level of around 300 mV when no stimulus (e.g., change in strain or temperature) is applied. At around 1600 ms into the test scenario, the example piezoelectric sensor is subjected to a relatively sudden change (e.g., impulse) in temperature, which results in a response 731 that includes a rise in temperature of greater than 4 degrees C. in around 400 ms, as well as a gradual decrease in temperature thereafter (as shown by temperature waveform 730).

The response 711 (shown in waveform 712) of the example piezoelectric sensor to the applied temperature impulse is limited in response to the periodic reset of the example piezoelectric sensor. For example, the temperature response of the example piezoelectric sensor as amplified by the LNA 673 is around 35 mV peak-to-peak (e.g., where the reset of the example piezoelectric sensor is periodically applied at intervals of 50 ms).

In contrast, the waveform 720 is an example piezoelectric sensor signal waveform generated by example piezoelectric sensor (such as example sensor 100) that is not periodically reset (e.g., operated without normalizing each of the nodes between adjacent capacitors of the first and second capacitor stacks 671 and 672). For example, the temperature response 721 of the example piezoelectric sensor as amplified by the LNA 673 (e.g., without piezoelectric sensor reset) is around 165 mV peak-to-peak. Further, the piezoelectric sensor (e.g., without reset) recovers over a period of thousands of milliseconds (e.g., several seconds). Accordingly, the reset of the example piezoelectric sensor lessens the impact of temperature upon the example piezoelectric sensor in extent (e.g., voltage swing) and time (e.g., limited to the period between successive reset operations).

Figure 8:
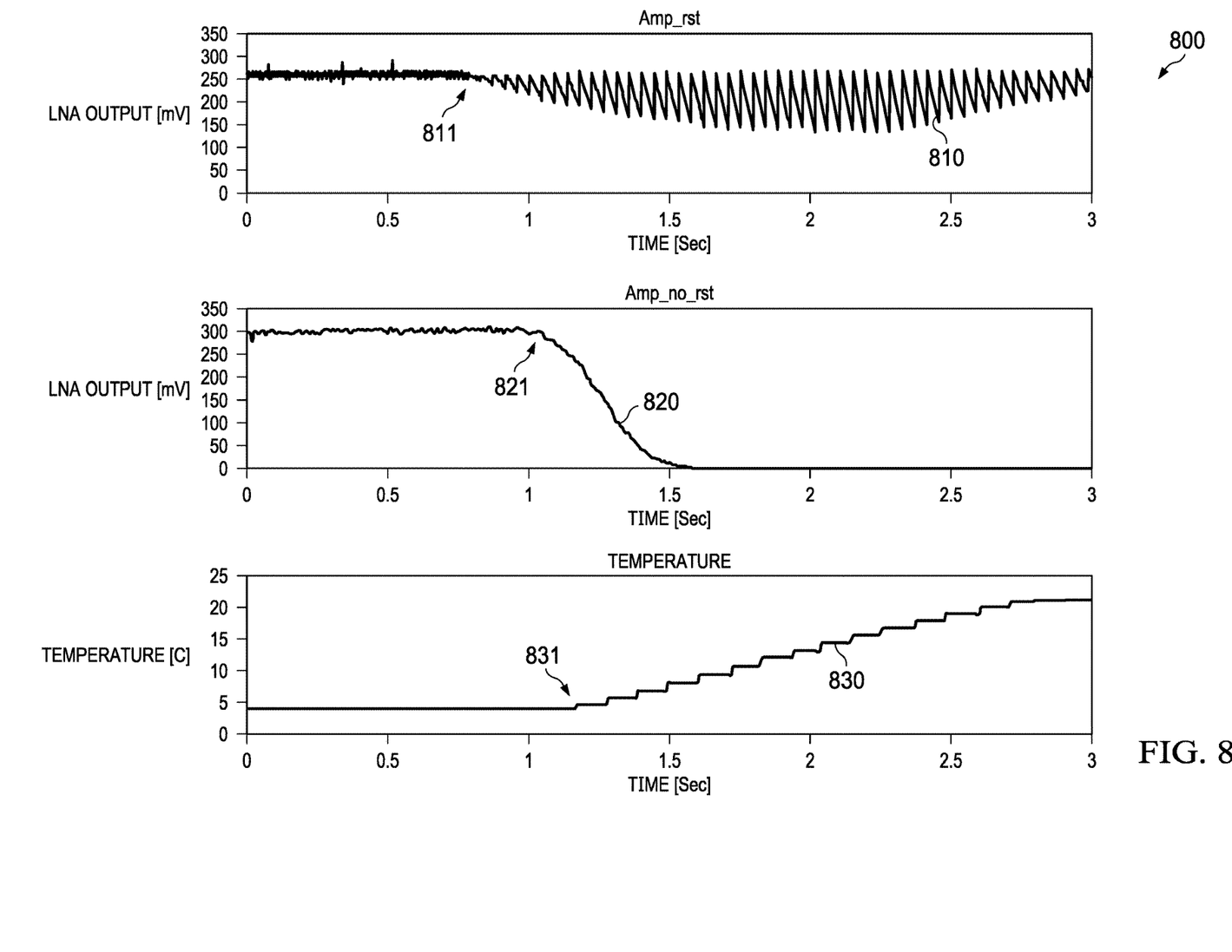
FIG. 8 is a waveform diagram of responses to temperature change in a second test scenario of an example piezoelectric sensing system.

FIG. 8 is a waveform diagram of responses to temperature change in a second test scenario 800 of an example piezoelectric sensing system. The test scenario 800 includes an example piezoelectric sensor signal waveform 810 generated in response to real-world measurements of an example piezoelectric sensor (such as example sensor 100) periodically operating in a reset sensor mode, such as described hereinabove with respect to FIG. 6.

For example, the waveform 810 can be generated as the output of the LNA 673, where the waveform 810 includes a voltage level of around 300 mV when no stimulus (e.g., change in strain or temperature) is applied. At around 1 second into the test scenario, the example piezoelectric sensor is subjected to a (e.g., gradual) rise 831 in temperature of around 10 degrees C. per second for around 2 seconds thereafter (as shown by temperature waveform 830).

The response 811 of the example piezoelectric sensor to the applied temperature impulse is limited in response to (e.g., as a result of) the periodic reset of the example piezoelectric sensor. For example, the temperature response (to the rise 831) of the example piezoelectric sensor as amplified by the LNA 673 is around 120 mV peak-to-peak (e.g., where the reset of the example piezoelectric sensor returns the voltage output from a low peak back to the original peak during each reset).

In contrast, the waveform 820 is an example piezoelectric sensor signal waveform generated by example piezoelectric sensor (such as example sensor 100) that is not periodically reset (e.g., operated without normalizing each of the nodes between adjacent capacitors of the first and second capacitor stacks 671 and 672). For example, the temperature response of the example piezoelectric sensor as amplified by the LNA 673 (e.g., without piezoelectric sensor reset) falls from the nominal voltage of 300 mV and "rails out" (e.g., by falling to a low limit defined by the lower voltage rail of the LNA 673). The "railing out" effect limits the effective dynamic range of the LNA 673, such that (for example) responses to changes in strain by the piezoelectric sensor (e.g., operating without reset) could not (and, hence, would not) be detected by the comparator. Accordingly, the reset of the example piezoelectric sensor increases the sensitivity of the example piezoelectric sensor (and associated circuitry) over wider ranges of temperature excursions.

In described examples, a pre-conditioning circuit (e.g., state machine) pre-conditions (e.g., biases) the sensor material (e.g., piezoelectric) so as to maximize and stabilize sensitivity over time and temperature. Additionally, the self-biasing of the amplifier minimizes leakage to extend low frequency performance range (as compared against relatively complicated charge amplifier circuits). Further, the described examples can be arranged on a single semiconductor (e.g., silicon) integrated circuit chip, which provides provide a full solution on a single substrate.

Various described examples include an integrated silicon device that includes a piezoelectric-based sensor array, sensor pre-condition, ultra-low leakage switches and signal amplification for strain-change detection, as a single silicon solution that can replace a sensor (which can be formed monolithically or assembled using discrete components) and AFE signal chain. Accordingly, various described examples can also facilitate reduced power consumption and help avoid off-chip and input/output related parasitics. Some of the various described examples include the ability to re-condition (e.g., repolarize) sensing material (e.g., PZT) to compensate for various effects, including the passage of time and changes in temperature.

Modifications are possible in the described embodiments, and other embodiments are possible, within the scope of the claims.

What is claimed is:

1. A circuit device comprising:
a set of capacitors coupled in series;
an amplifier coupled to the set of capacitors;
a first switch coupled between the set of capacitors and the amplifier;
a set of buffers;
a set of switches coupled between the set of buffers and the set of capacitors; and
a control circuit that includes a first set of outputs coupled to the set of buffers and a second set of outputs coupled to the set of switches, wherein the control circuit is configured to close the first switch when the set of switches are open, and close the set of switches when the first switch is open.

2. A circuit device comprising:
a set of capacitors coupled in series;
an amplifier coupled to the set of capacitors;
a set of buffers;
a set of switches coupled between the set of buffers and the set of capacitors; and
a control circuit that includes a first set of outputs coupled to the set of buffers and a second set of outputs coupled to the set of switches;
wherein:
the second set of outputs of the control circuit includes a first enable output, a second enable output, and a third enable output; and
each switch of the set of switches includes:
a first transistor coupled between a respective buffer of the set of buffers and the set of capacitors, wherein the first transistor includes:
a gate coupled to the second enable output of the control circuit; and
a backgate;
a second transistor coupled between the backgate of the first transistor and a ground node, wherein the second transistor includes a gate coupled to the first enable output of the control circuit; and
a third transistor coupled between the backgate of the first transistor and a reference voltage node, wherein the third transistor includes a gate coupled to the third enable output of the control circuit.

3. The circuit device of claim 2, wherein the control circuit is configured to operate in a reset mode by providing a set of signals at the second set of outputs such that the first transistor and the third transistor are closed.

4. The circuit device of claim 2, wherein each switch of the set of switches further includes a fourth transistor coupled between the first transistor and the respective buffer of the set of buffers, wherein the fourth transistor includes a gate coupled to the first enable output of the control circuit.

5. The circuit device of claim 4, wherein each switch of the set of switches further includes:
a node disposed between the first transistor and the fourth transistor; and
a fifth transistor coupled between the node and the reference voltage node, wherein the fifth transistor includes a gate coupled to the third enable output of the control circuit.

6. The circuit device of claim 5, wherein the control circuit is configured to operate in a reset mode by providing a set of signals at the second set of outputs such that the first transistor, the third transistor, and the fifth transistor are closed and such that the second transistor and the fourth transistor are open.

7. The circuit device of claim 2, wherein the control circuit is configured to operate in a polarization mode by:
providing a set of signals at the second set of outputs such that the first transistor and the second transistor are closed; and
providing a set of signals at the first set of outputs such that a polarization voltage is applied across each capacitor of the set of capacitors.

8. The circuit device of claim 2, wherein the control circuit is configured to operate in a sensing mode by providing a set of signals at the second set of outputs such that the third transistor is closed.

9. The circuit device of claim 1, wherein the amplifier includes a first input of a differential input pair coupled to a first end of the set of capacitors and a second input of the differential input pair coupled to a second end of the set of capacitors.

10. The circuit device of claim 9, further comprising:
the first switch coupled between the first input of the amplifier and the first end of the set of capacitors; and
a second switch coupled between the second input of the amplifier and the second end of the set of capacitors.

11. The circuit device of claim 1, wherein:
the set of capacitors includes a midpoint node disposed at a midpoint of the set of capacitors; and
the circuit device further comprises a switch coupled between the midpoint node and a reference voltage node.

12. The circuit device of claim 1, further comprising a programmable gain amplifier that includes an input coupled to the amplifier and an output.

13. The circuit device of claim 12, further comprising: a comparator circuit that includes an input coupled to the output of the programmable gain amplifier.

14. A circuit device comprising:
a set of capacitors coupled in series that includes a midpoint node coupled to a reference voltage node;
a set of buffers;
a set of switches coupled between the set of buffers and the set of capacitors;
a control circuit that includes a set of enable outputs coupled to the set of switches;
a first amplifier that includes:
a first input coupled to a first end of the set of capacitors;
a second input coupled to a second end of the set of capacitors; and
an output;
a first switch coupled between the set of capacitors and the first input of the first amplifier;
a second amplifier that includes:
an input coupled to the output of the first amplifier; and
an output; and
a comparator circuit that includes:
a first input coupled to the output of the second amplifier; and
a second input coupled to the reference voltage node, wherein the first switch is configured to be closed when the set of switches are open, and open when the set of switches are closed.

15. A circuit device comprising:
a set of capacitors coupled in series that includes a midpoint node coupled to a reference voltage node;
a set of buffers;
a set of switches coupled between the set of buffers and the set of capacitors;
a control circuit that includes a set of enable outputs coupled to the set of switches;
a first amplifier that includes:
a first input coupled to a first end of the set of capacitors;
a second input coupled to a second end of the set of capacitors; and
an output;
a second amplifier that includes:
an input coupled to the output of the first amplifier; and
an output; and
a comparator circuit that includes:
a first input coupled to the output of the second amplifier; and
a second input coupled to the reference voltage node;
wherein:
the control circuit is a first control circuit;
the circuit device further comprises a second control circuit that includes:
a reset output;
a sample output;
a hold output; and
a compare output;
the first control circuit includes a reset input coupled to the reset output of the second control circuit;
the first amplifier includes an enable input coupled to the sample output of the second control circuit;
the second amplifier includes an enable input coupled to the hold output of the second control circuit; and
the comparator circuit includes an enable input coupled to the compare output of the second control circuit.

16. The circuit device of claim 15, wherein:
the set of enable outputs of the first control circuit includes a first enable output, a second enable output, and a third enable output; and
each switch of the set of switches includes:
a first transistor coupled between a respective buffer of the set of buffers and the set of capacitors, wherein the first transistor includes:
a gate coupled to the second enable output of the first control circuit; and
a backgate;
a second transistor coupled between the backgate of the first transistor and a ground node, wherein the second transistor includes a gate coupled to the first enable output of the first control circuit; and
a third transistor coupled between the backgate of the first transistor and the reference voltage node, wherein the third transistor includes a gate coupled to the third enable output of the first control circuit.

17. The circuit device of claim 16, wherein the first control circuit is configured to provide a set of signals on the set of enable outputs based on a signal received from the reset output of the second control circuit.

18. The circuit device of claim 17, wherein the first control circuit is configured to provide the set of signals at the set of enable outputs such that the first transistor and the third transistor are closed.

19. The circuit device of claim 16, wherein each switch of the set of switches further includes a fourth transistor coupled between the first transistor and the respective buffer of the set of buffers, wherein the fourth transistor includes a gate coupled to the first enable output of the first control circuit.

20. The circuit device of claim 19, wherein each switch of the set of switches further includes:

a node disposed between the first transistor and the fourth transistor; and a fifth transistor coupled between the node and the reference voltage node, wherein the fifth transistor includes a gate coupled to the third enable output of the first control circuit.

21. The circuit device of claim 14, further comprising a second switch coupled between the midpoint node and the reference voltage node, wherein the second switch is configured to be closed when the set of switches are open, and open when the set of switches are closed.

* * * * *